(12) United States Patent
Bucher

(10) Patent No.: US 6,688,438 B2
(45) Date of Patent: Feb. 10, 2004

(54) ACTUATOR WITH A CENTRIFUGAL BRAKE

(75) Inventor: Johannes Bucher, Schübelbach (CH)

(73) Assignee: Siemens Building Technologies AG (CH)

( * ) Notice: Subject to any disclaimer, the term of this patent is extended or adjusted under 35 U.S.C. 154(b) by 0 days.

(21) Appl. No.: 10/117,454

(22) Filed: Apr. 5, 2002

(65) Prior Publication Data

US 2002/0170786 A1 Nov. 21, 2002

(30) Foreign Application Priority Data

May 18, 2001 (EP) ............................ 01112235

(51) Int. Cl.⁷ ................................. B60T 8/72
(52) U.S. Cl. .................... 188/185; 310/68 E; 200/80 R
(58) Field of Search ................. 188/184, 185, 188/180, 188, 189; 187/350, 373; 310/68 E, 76, 77; 200/19.23, 80 R

(56) References Cited

U.S. PATENT DOCUMENTS

| | | | | | |
|---|---|---|---|---|---|
| 3,760,570 A | * | 9/1973 | Ehrlich et al. | ............... | 56/10.8 |
| 4,219,107 A | * | 8/1980 | Frosch et al. | ............... | 188/134 |
| 4,297,829 A | * | 11/1981 | Hoff | ........................ | 56/11.3 |
| 4,334,161 A | * | 6/1982 | Carli | ........................ | 310/68 E |
| 4,412,418 A | * | 11/1983 | Beale | ........................ | 60/520 |
| 4,513,805 A | * | 4/1985 | Mase | ........................ | 160/299 |
| 5,186,289 A | * | 2/1993 | Wolner et al. | ............... | 188/180 |
| 5,662,542 A | | 9/1997 | Birchmeier | ................ | 475/154 |
| 5,988,328 A | | 11/1999 | Newport | ..................... | 188/186 |

FOREIGN PATENT DOCUMENTS

| | | | |
|---|---|---|---|
| EP | 297453 | | 1/1989 |
| GB | 1379683 A | * | 1/1975 |
| GB | 1492631 | | 11/1977 |
| JP | 733392 A | * | 2/1995 |

* cited by examiner

Primary Examiner—Jack Lavinder
Assistant Examiner—Melody M. Burch
(74) Attorney, Agent, or Firm—Greer, Burns & Crain, Ltd

(57) ABSTRACT

An operating mechanism for operating an actuating member is provided with an electric motor, a resetting spring and a centrifugal brake, wherein the actuating member can be operated in a first direction of movement by the electric motor activated by means of a control or regulating device, and in a second direction of movement by means of the resetting spring. In accordance with the invention, a brake body of the centrifugal brake is arranged on the rotor of the electric motor. The centrifugal brake arranged directly on the rotor can be configured such that a braking effect is generated only when the actuating member is operated by the resetting spring. When operated by the electric motor being switched on, on the other hand, the centrifugal brake has no braking effect. By means of the centrifugal brake, the speeds that can be reached are limited to the extent that no spurious vibrations and noises occur.

8 Claims, 4 Drawing Sheets

ACTUATOR WITH A CENTRIFUGAL BRAKE

BACKGROUND OF THE INVENTION

1. Field of the Invention

The invention relates to an actuator, and furthermore to an actuating member with the actuator and to an electric motor.

An operating mechanism of this type is advantageously used in heating, ventilation and air-conditioning systems for operating actuating members such as valves or gates and the like. An electric motor of the operating mechanism is controllable, for example, with a two-position controller, wherein the electric motor is switched on in the "on" state, and the actuating member is operated in a first direction counter to the force of a resetting spring. In the "off" state, the electric motor is switched off so that the resetting spring operates the actuating members counter to the first direction.

2. Description of the Prior Art

Known operating mechanisms of this type have the disadvantage that, when the electric motor is in the switched off state, relatively high speeds are generated by the resetting spring in the operating mechanism, due to which spurious mechanical vibrations and noises in particular occur.

A centrifugal brake for actuators with a resetting function is known from EP 297 453 A1, which can be coupled to a journal of a reduction stage. Damage to the actuator when a resetting spring is released is prevented by means of the centrifugal brake.

SUMMARY OF THE INVENTION

The object of the invention is to provide an actuator wherein a certain speed is not exceeded, so spurious mechanical vibrations and noises are prevented, and by means of its design takes up as little space as possible.

According to a first aspect of the present invention, there is provided an operating mechanism for operating an actuating member, comprising an electric motor provided with a rotor, an energy store and a centrifugal brake, wherein the actuating member can be operated in a first direction of movement by means of the switched-on electric motor and in a second direction of movement by means of the energy store, and a brake body of the centrifugal brake is arranged on the rotor of the electric motor.

According to a second aspect of the present invention, there is provided an actuating member with an operating mechanism in accordance with the first aspect of the invention.

According to a third aspect of the present invention, there is provided a synchronous motor for an operating mechanism for operating an actuating member, comprising a rotor upon which a brake body of a centrifugal brake is arranged.

According to a fourth aspect of the present invention, there is provided an electric motor for an operating mechanism in accordance with the first aspect of the invention.

Advantageous configurations will be evident from the dependent claims.

BRIEF DESCRIPTION OF THE DRAWINGS

Embodiments of the invention will hereinafter be described in more detail with reference to the drawings.

There is shown, in.

DESCRIPTION OF THE PREFERRED EMBODIMENTS

Figure 1:
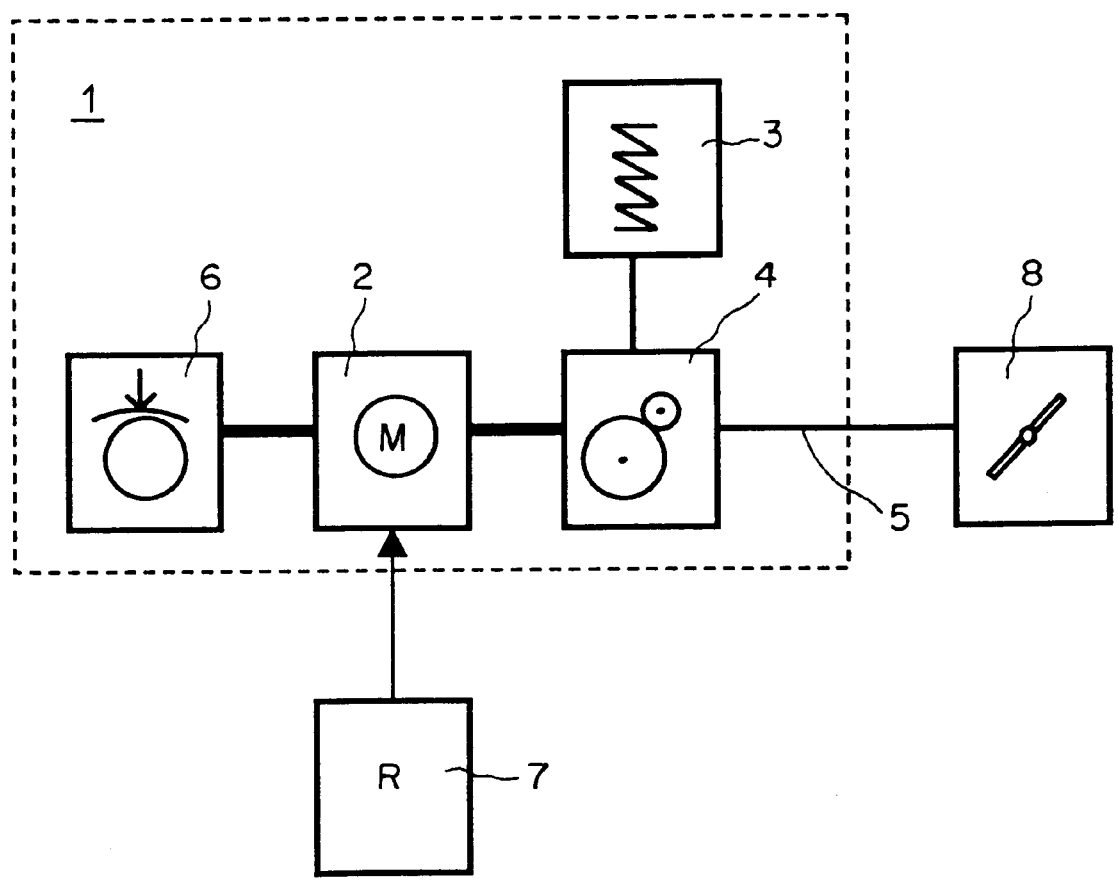
FIG. 1 a schematic representation of an actuator with function blocks.

In FIG. 1, 1 denotes an actuator that is provided with an electric motor 2, a resetting spring 3 acting as a mechanical energy store, a gearing 4, a transmission element 5 and a centrifugal brake 6. The electric motor 2 can be switched on and off by means of a controlling or regulating device 7, wherein the controlling or regulating device is implemented, for example, as a two-position controller, but in the simplest instance by means of an electric switch.

The actuator 1 serves to operate an actuating element 8 that is connected for this purpose to the transmission element 5 of the actuator 1. The actuating member 8 is, for example, a valve or a gate.

The electric motor 2, the resetting spring 3 and the transmission element 5 are mechanically coupled and connected to one another via the gearing 4 such that the actuating member 8 connected to the transmission element can be operated in a first direction of movement by the electric motor 2 activated by means of the controlling or regulating device 7, and in a second direction of movement by means of the resetting spring 3. The resetting spring 3 is loaded by the switched-on electric motor 2 when the actuating member 8 is operated in a first direction of movement.

The gearing 4 is advantageously configured such that at least one reduction stage is effective between the electric motor 2 and the transmission element 5, and also between the electric motor 2 and the resetting spring 3.

Advantageously, the gearing 4 operates as a support from the point of view of the electric motor 2, such that the required forces can be obtained on the actuating member 8, wherein the greatest angular velocities occur on the rotor of the electric motor 2. According to the invention, the centrifugal brake 6 is arranged on the rotor of the electric motor 2, so that the centrifugal brake 6 is moved with the angular velocity of the rotor. Because the gearing 4 acts as a support from the point of view of the electric motor 2, the centrifugal brake 6 is adjustable—advantageously with the aid of an appropriately dimensioned priming spring—such that a braking action only occurs when the actuating member 8 is operated in the second direction of movement, that is to say operated by the resetting spring 3. On the other hand, for the first direction of movement, that is to say when the actuating member 8 is operated by the electric motor 2, the centrifugal brake 6 is advantageously configured such that no braking action occurs.

The electric motor 2 is preferably a synchronous motor so that when in the switched-on state there is a constant speed whereby the temporal behaviour of an actuating motion in the first direction of movement is exactly defined.

In a typical configuration of the actuator, the speed of the rotor can be, for example, 500 revolutions per minute when the resetting spring is loaded. When the loaded resetting spring returns to the switched off state of the electric motor, the rotor speed is limited by the centrifugal brake to approximately 1000 revolutions per minute, whereas without the centrifugal brake typically several thousand revolutions per minute would be reached, which would cause spurious vibrations and noises.

Figure 2:
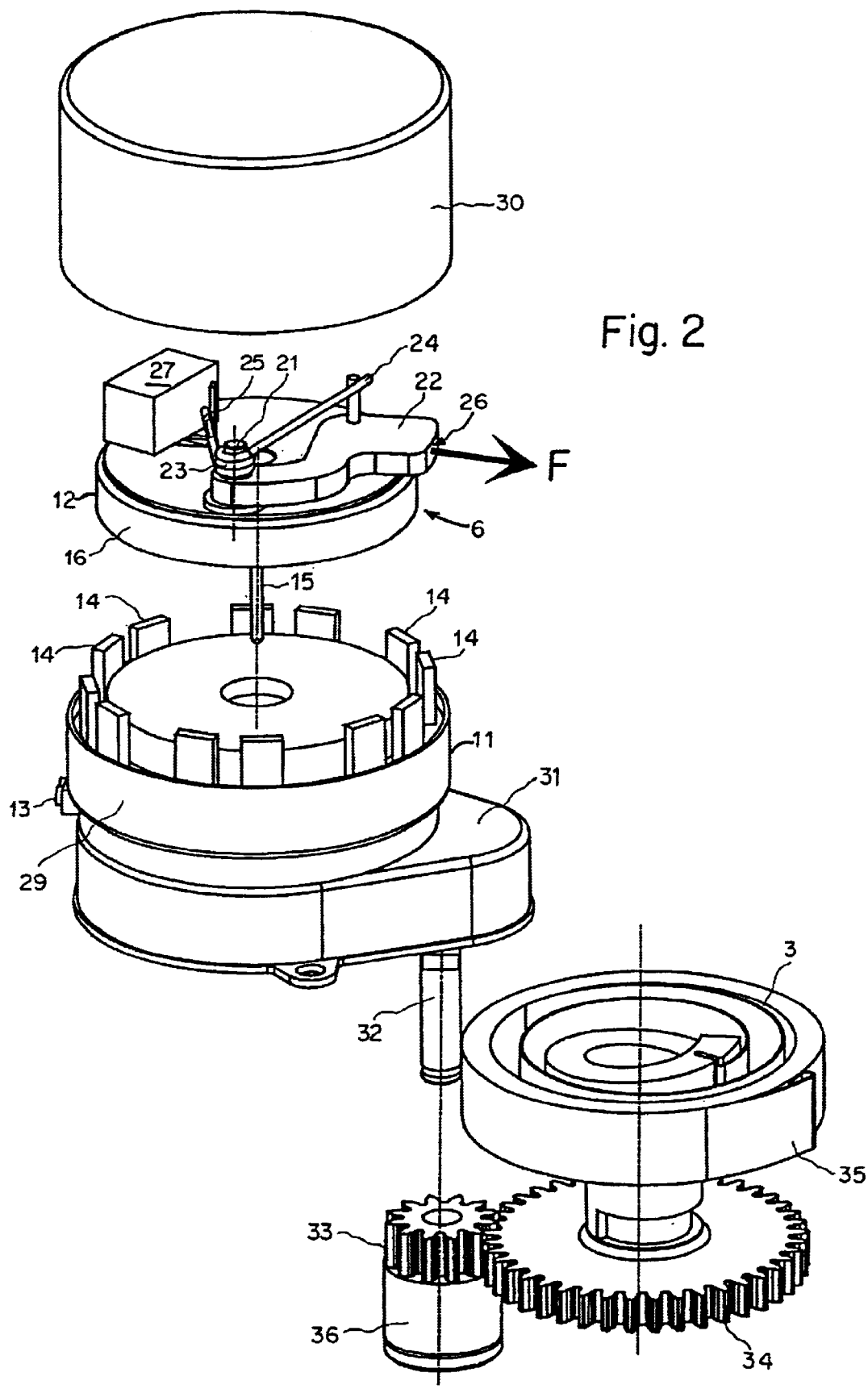
FIG. 2 an exploded diagram of the actuator.

In FIG. 2, 11 designates a stator and 12 a rotor of the electric motor (FIG. 1). The stator 11 has electrical connections 13 and several poles 14 for a magnetic rotating field. The rotor 12 is, for example, a rotor disc arranged in a rotatable manner with a rotor shaft 15 and with an edge 16 on the inner side of which magnetic rotor poles, not shown in the drawing, are arranged.

The centrifugal brake 6 (FIG. 1) is arranged in accordance with the invention on the rotor 12 and connected to the rotor 12. In a first variation of an embodiment, the centrifugal brake 206 is provided with a brake body 22 arranged in a pivotable manner about a bearing mandrel 21, wherein the bearing mandrel 21 is arranged eccentrically upon the rotor 12. Advantageously the brake body 22 is coupled to a priming spring 23. The priming spring 23 is configured and arranged primed such that brake body 22 can only be pivoted away counter to the force of the priming spring 23 by means of a centrifugal force F acting upon the braking body 22 once there is a certain angular velocity $\omega_r$ of the rotor.

The priming spring 23 is implemented, for example, as a leg spring that is arranged on the bearing mandrel 21, wherein a first limb 24 of the leg spring engages with the brake body 22, and a second limb 25 with the rotor 12.

Advantageously, the brake body 22 is provided with a brake liner 26 that is arranged in the region of the contact surface between the brake body 22 and a brake drum 30.

The rotor 12, configured asymmetrically with respect to the axis of the rotor shaft 15 in particular by means of the brake body 22, is advantageously balanced by means of a balancing weight 27 shown schematically in FIG. 2.

A particularly simple and space-saving design of the actuator 1 can be obtained when the brake drum 30 is at the same time a part of the covering of the electric motor 2, by means of which the rotor 12 and the centrifugal brake 206 can be covered. The brake drum 30 advantageously configured as a cover is, for example, fixed to a stator cover 29.

A gearbox 31 connected to the stator 11 is provided with a rotor shaft 15 with a reduction stage of the gearing 4 (FIG. 1) coupling an output shaft 32.

The resetting spring 3, implemented, for example, as a coil spring, is in this case coupled via a further reduction stage of the gearing 4 (FIG. 1) provided with a pinion and a toothed wheel 34 wherein the pinion 33 is connected with the output shaft 32. One end 35 of the resetting spring 3 is advantageously connected to the gearbox 31.

The transmission element 5 (FIG. 1) is implemented, for example, by the output shaft 32 or by a hub 36 mounted on the output shaft 32.

Figure 3:
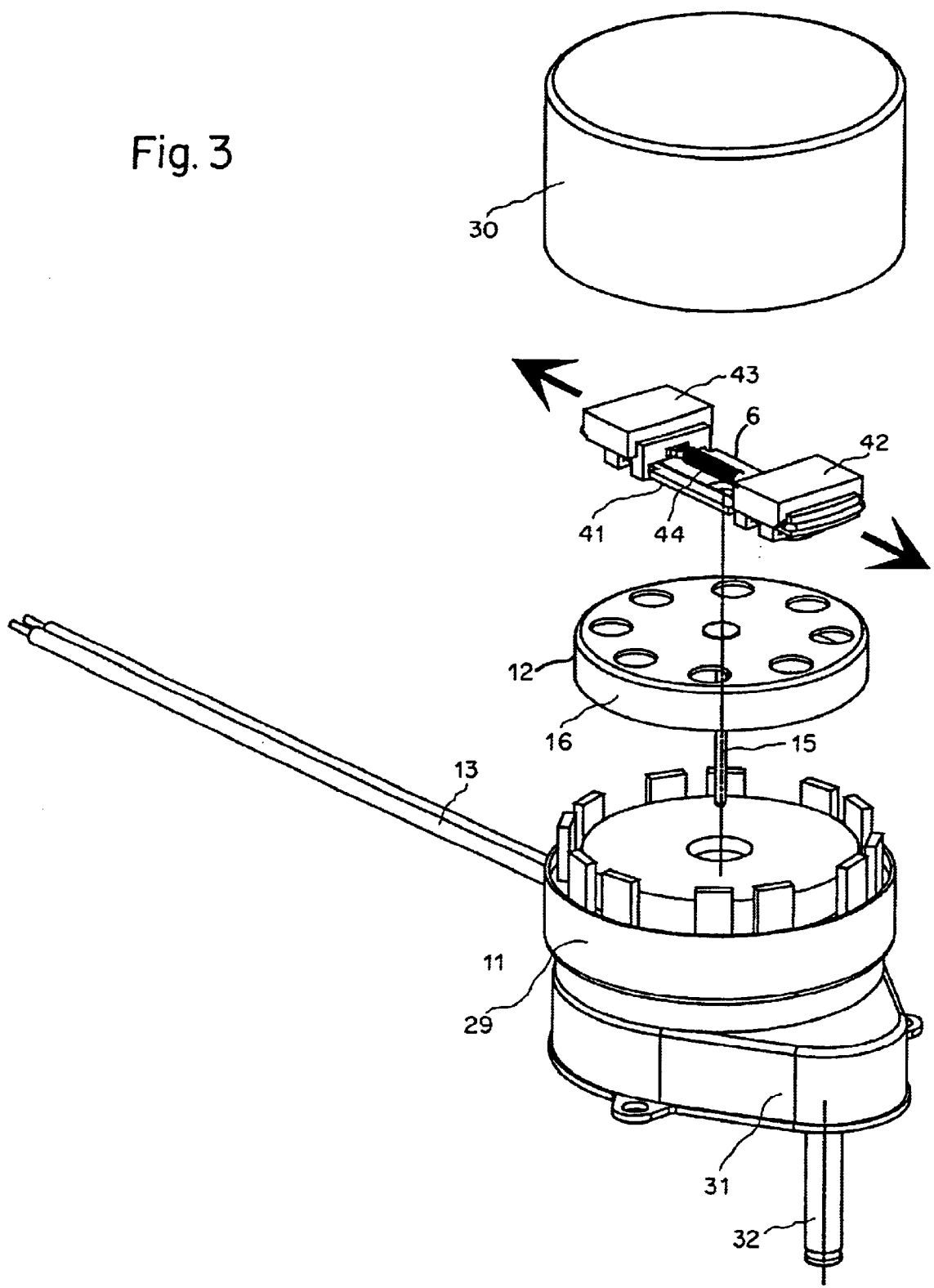
FIG. 3 an exploded diagram of a variation of the actuator.
Figure 4:
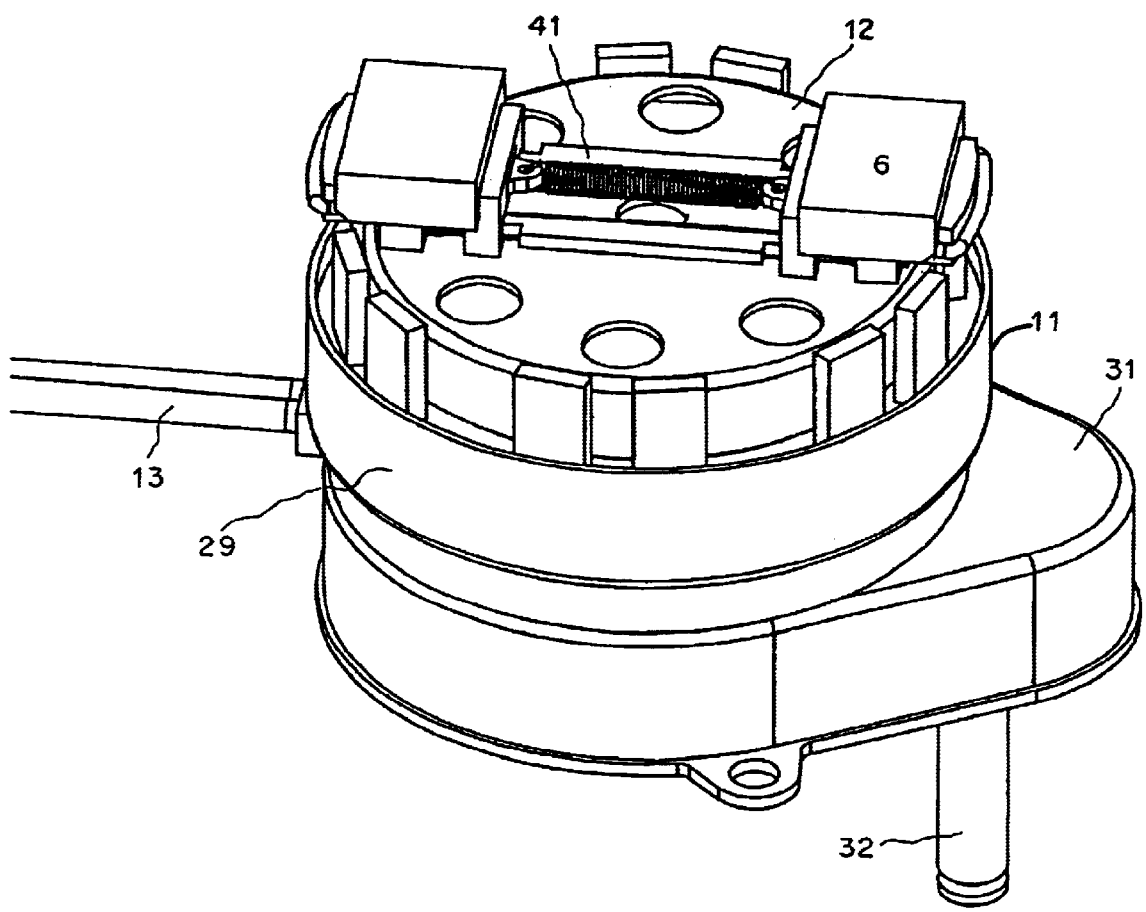
FIG. 4 a part of the variation of the actuator in the assembled state.

The variation of the actuator shown in FIG. 3 shows functional elements already described hereinabove of the actuator 1 such as the stator 11 with the electrical connections 13 and the stator cover 29, the gearbox 31 with the output shaft 32, the rotor 12 with the rotor shaft 15 and the edge 16 and the brake drum 30.

A second variation of an embodiment of the centrifugal brake 6 (FIG. 1) is connected in accordance with the invention to the rotor 12. The centrifugal brake 6 is provided with a guide rail 41 and brake bodies 42 and 43 arranged in a slideable manner on the guide rail 41, which brake bodies are primed by means of a tension spring 44 and are coupled to one another. The tension spring 44 is configured and arranged primed such that the brake bodies 42 and 43 are pressed by means of a centrifugal force acting upon the brake bodies 42 and 43 onto the brake drum 30 only once there is a certain angular velocity $\omega_r$ of the rotor.

Because the centrifugal brake 6 is arranged directly on the rotor 12, limiting of the speed of the electric motor 2 to a value below a threshold at which spurious vibrations and noises occur is made possible. In addition a space-saving design of the actuator 1 is made possible.

In selecting the material for the centrifugal brake 6, care should be taken that the magnetic manner of operation of the rotor 12 is not disturbed by the material of the centrifugal brake 6, and the arrangement thereof on the rotor 12.

I claim:

1. Operating mechanism for operating an actuating member, comprising an electric motor provided with a stator and a rotor, wherein the rotor has a concentric rotor shaft that rotates in a magnetic field of the motor, an energy store and a centrifugal brake, wherein the actuating member can be operated in a first direction of movement by means of the electric motor being switched on and in a second direction of movement by means of the energy store, and a brake body of the centrifugal brake is arranged on the rotor of the electric motor and directly connected to the rotor, so that the centrifugal brake is moved with the angular velocity of the rotor.

2. Operating mechanism according to claim 1, wherein a part of a covering of the electric motor is configured as a brake drum of the centrifugal brake.

3. Operating mechanism according to claim 1, wherein the operation of the actuating member is guided in the first direction of movement by means of at least one reduction stage.

4. Operating mechanism according to claim 1, wherein the energy store is implemented by a spring that can be tensioned in the first direction of movement by the electric motor when the actuating member is operated.

5. Operating mechanism according to claim 4, wherein the spring is mechanically coupled via at least one reduction stage with the electric motor.

6. Synchronous motor for an operating mechanism for operating an actuating member, the synchronous motor comprising a stator and a rotor, wherein the rotor has a concentric rotor shaft that rotates in a magnetic field of the motor, an energy store and a centrifugal brake, wherein the actuating member can be operated in a first direction of movement by means of the synchronous motor being switched on and in a second direction of movement by means of the energy store, and a brake body of the centrifugal brake is arranged on the rotor of the synchronous motor and directly connected to the rotor, so that the centrifugal brake is moved with the angular velocity of the rotor.

7. An actuating member operated by an operating mechanism comprising an electric motor provided with a stator and a rotor, wherein the rotor has a concentric rotor shaft that rotates in a magnetic field of the motor, an energy store and a centrifugal brake, wherein the actuating member can be operated in a first direction of movement by means of the electric motor being switched on and in a second direction of movement by means of the energy store, and a brake body of the centrifugal brake is arranged on the rotor of the electric motor and directly connected to the rotor, so that the centrifugal brake is moved with the angular velocity of the rotor.

8. An electric motor for use in an operating mechanism for operating an actuating member, the electric motor comprising:

a rotor, a stator, an energy store and a centrifugal brake, wherein the rotor has a concentric rotor shaft that rotates in a magnetic field of the motor, wherein the actuating member can be operated in a first direction of movement by means of the electric motor being switched on and in a second direction of movement by means of the energy store, and a brake body of the centrifugal brake is arranged on the rotor of the electric motor and directly connected to the rotor, so that the centrifugal brake is moved with the angular velocity of the rotor.

* * * * *